(12) United States Patent
Jane Santamaria

(10) Patent No.: US 7,249,803 B2
(45) Date of Patent: Jul. 31, 2007

(54) INFANT SEAT FOR MOTORCARS

(75) Inventor: Manuel Jane Santamaria, Palau de Plegamans (ES)

(73) Assignee: Jane, S.A., Palau de Piegamans (Barcelona) (ES)

( * ) Notice: Subject to any disclaimer, the term of this patent is extended or adjusted under 35 U.S.C. 154(b) by 0 days.

(21) Appl. No.: 11/520,534

(22) Filed: Sep. 12, 2006

(65) Prior Publication Data

US 2007/0063556 A1 Mar. 22, 2007

(30) Foreign Application Priority Data

Sep. 12, 2005 (ES) .............................. 200502001 U

(51) Int. Cl.
*B60R 22/00* (2006.01)
(52) U.S. Cl. .................... 297/467; 297/484; 297/250.1
(58) Field of Classification Search ................ 297/467, 297/484, 250.1
See application file for complete search history.

(56) References Cited

U.S. PATENT DOCUMENTS

| | | | | |
|---|---|---|---|---|
| 6,030,047 A | * | 2/2000 | Kain | 297/484 |
| 6,491,348 B1 | * | 12/2002 | Kain | 297/484 |
| 6,588,849 B2 | * | 7/2003 | Glover et al. | 297/467 |
| 6,623,074 B2 | * | 9/2003 | Asbach et al. | 297/250.1 |
| 6,779,843 B2 | * | 8/2004 | Kain | 297/250.1 |

* cited by examiner

*Primary Examiner*—Anthony D. Barfield
(74) *Attorney, Agent, or Firm*—Merchant & Gould P.C.

(57) ABSTRACT

This seat comprises a body (1) forming the actual seat (2) and the backrest (3) and being provided with safety straps (4) and (5) for the child, said straps being fitted to a crotch strip (7). This seat is characterized in that the straps (4) and (5) are fitted to a headrest (8) being fitted to the backrest (3) in a vertically shiftable arrangement and being integrally provided with a mechanism (9) from which a transmission element (10) extends which is linked to the lower end (7') of the crotch strip (7), this latter being also fitted in a slidable arrangement, in such a way that the lifting and lowering motions of the headrest (8) bring about a joint increase or reduction of the space being afforded both by the straps (4) and (5) and the crotch strip (7). The headrest (8) comprises means (19) being provided for locking it in its different positions.

7 Claims, 2 Drawing Sheets

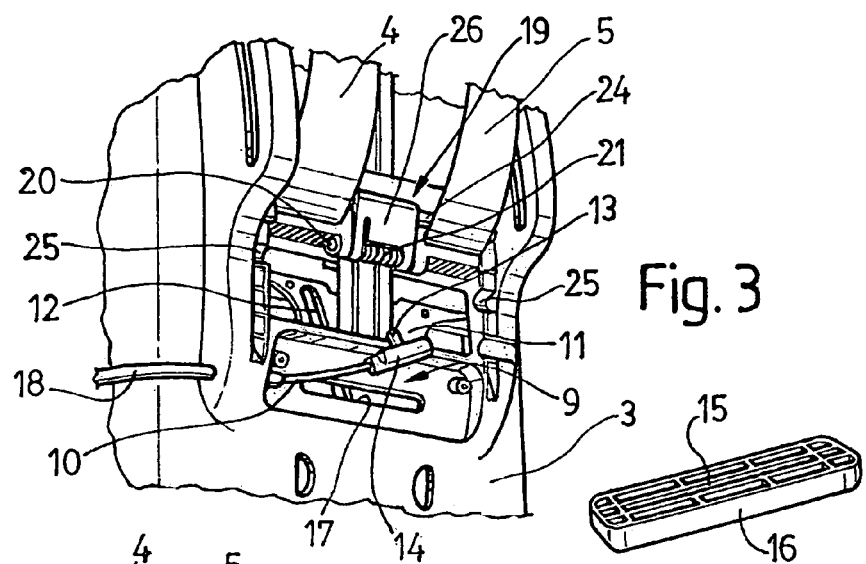
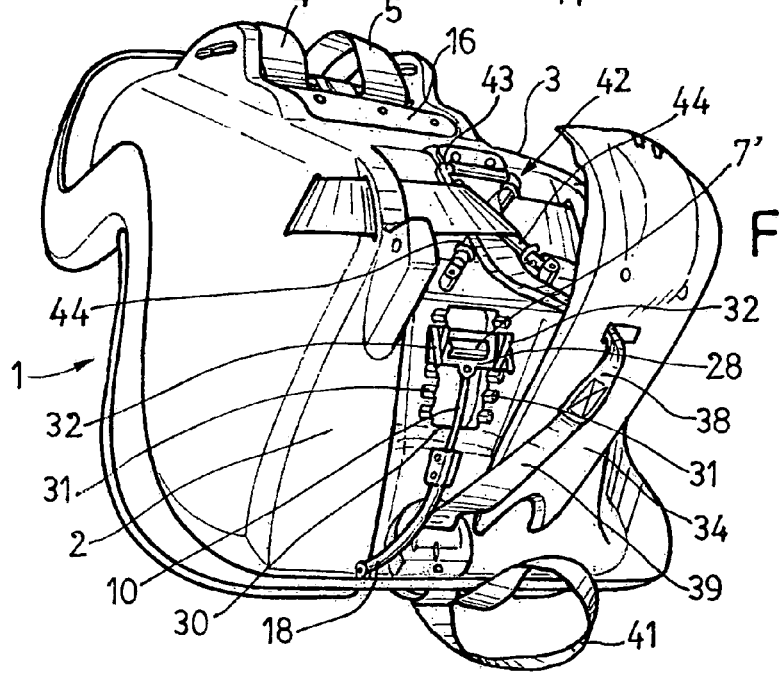
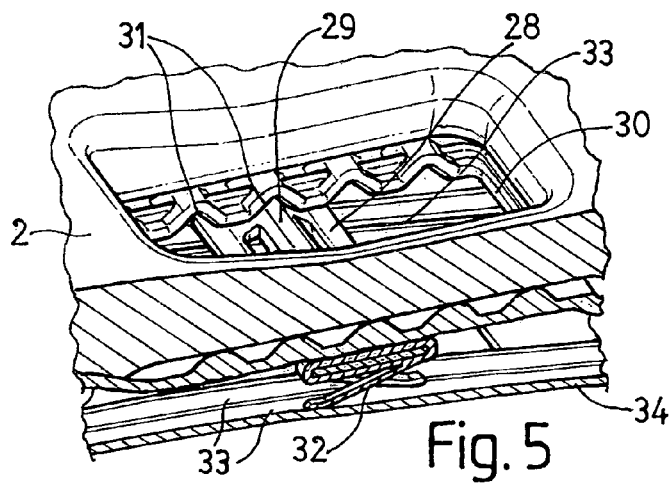
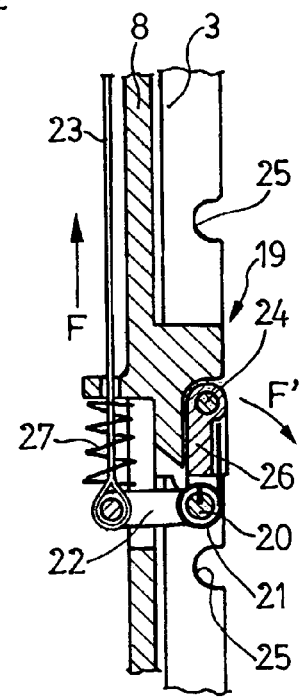
Fig. 3
Fig. 4
Fig. 5
Fig. 6

INFANT SEAT FOR MOTORCARS

BACKGROUND OF THE INVENTION

Several types of infant seats are already existing which in order to securely fasten the child to the seat comprise a strapping being formed by two adjustable straps being linked through a buckle to a crotch strip, said straps being joined to each other at the rear portion of the backrest and thereby forming a length passing through a tension device and extending beyond the front portion of the seat.

For the children's safety these seats are generally installed on the back seats of the motor vehicles.

Some of these infant seats comprise a backrest being provided with a headrest and are designed for rather small children of 1 to 5 years of age, for example.

In some of said seats the headrest forms a separate piece that is to be fitted to the backrest in an upwardly shiftable arrangement in order to be thus adapted to the child's height, the two straps of the strapping being fitted to the headrest.

In these seats there is the drawback that the straps will progressively adapt to the child's height as per the extent of the child's growth, but the same does not happen with the crotch strip, this latter being fixedly secured to the seat, in such a way that the more the child grows the greater its discomfort on the seat becomes because of the increasingly stronger pressing action being exerted on its crotch by the aforementioned strip.

SUMMARY OF THE INVENTION

It is the object of this invention to obviate this drawback by improving this type of seats in such a way that when adjusting the length of the straps making up the strapping a corresponding adjustment of the space being afforded by the crotch strip is also obtained, said length and afforded space being hence jointly increased.

In order to obtain this benefit a characterizing feature lies in the fact that the straps are fitted to the headrest, this latter being fitted to the backrest in a vertically shiftable arrangement and being integrally provided with a mechanism from which a transmission element extends which is linked to the lower end of the crotch strip, this latter being also fitted in a slidable arrangement, in such a way that the lifting and lowering motions of the headrest bring about a joint increase or reduction of the space being afforded both by the straps and the crotch strip.

The headrest comprises means being provided for locking it in its different positions, said means including a resiliently biased angular element being fit to be swung about its angular point, one of the branches of said angular element being provided for being manually actuated whereas the other branch is fitted with a transversal element being intended to fit into recesses being provided along the rear portion of the backrest.

The transmission mechanism being provided for shifting the crotch strip comprises a plate being provided with a slant slit therein, the head of a horizontal slider being slidingly engaged in said slit, said slider having a flexible rod or rope linked to it, said flexible rod or rope making up the transmission element being fitted to the lower end of the crotch strip through a small frame being fit to be shifted in a window of the seat bottom, said frame being thus removably retained at different locations along said window.

These and other features will be best made apparent by the following detailed description whose understanding will be made easier by the accompanying two sheets of drawings showing a practical embodiment being cited only by way of example not limiting the scope of the present invention.

DESCRIPTION OF THE DRAWINGS

In the drawings:

FIG. 3 shows in a perspective view the detail of the mechanism being provided for transmitting the motion of the headrest to the crotch strip;

FIGS. 4 and 5 depicts in a perspective view a detail of the frame to which the crotch strip is fitted as seen from below and from above, respectively; and FIG. 6 shows in a diagrammed, elevational section the means being provided for locking the different positions of the headrest.

DETAILED DESCRIPTION

Figure 1:
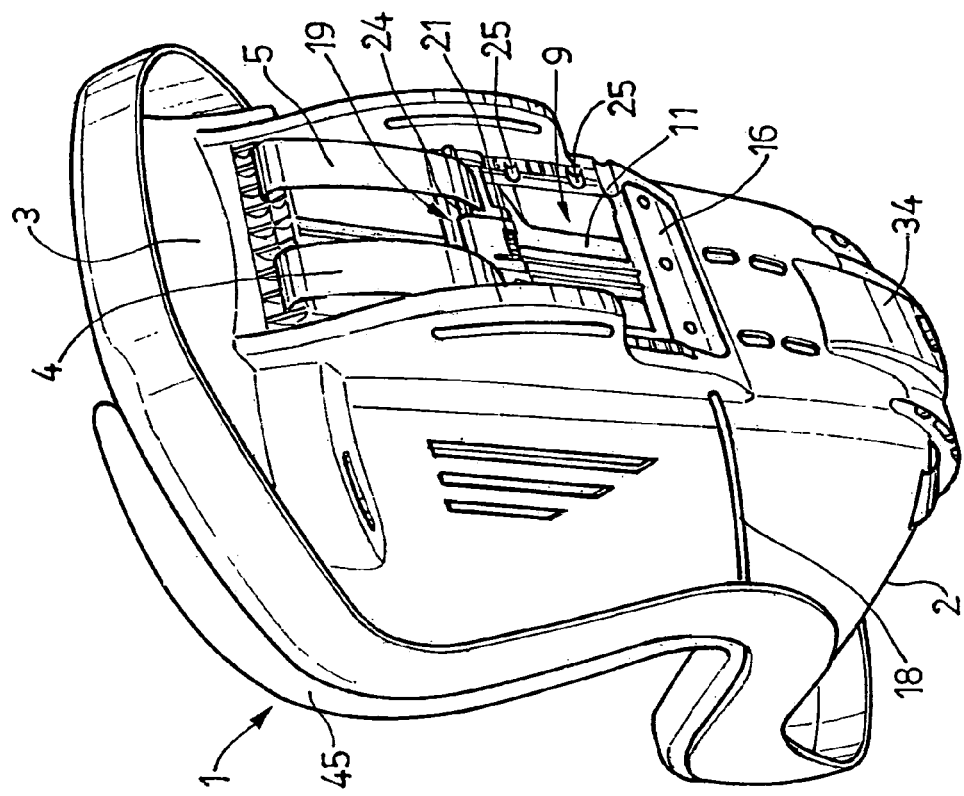
FIGS. 1 and 2 respectively illustrate in a perspective view from the front and from the rear the infant seat being the object of the invention.
Figure 2:
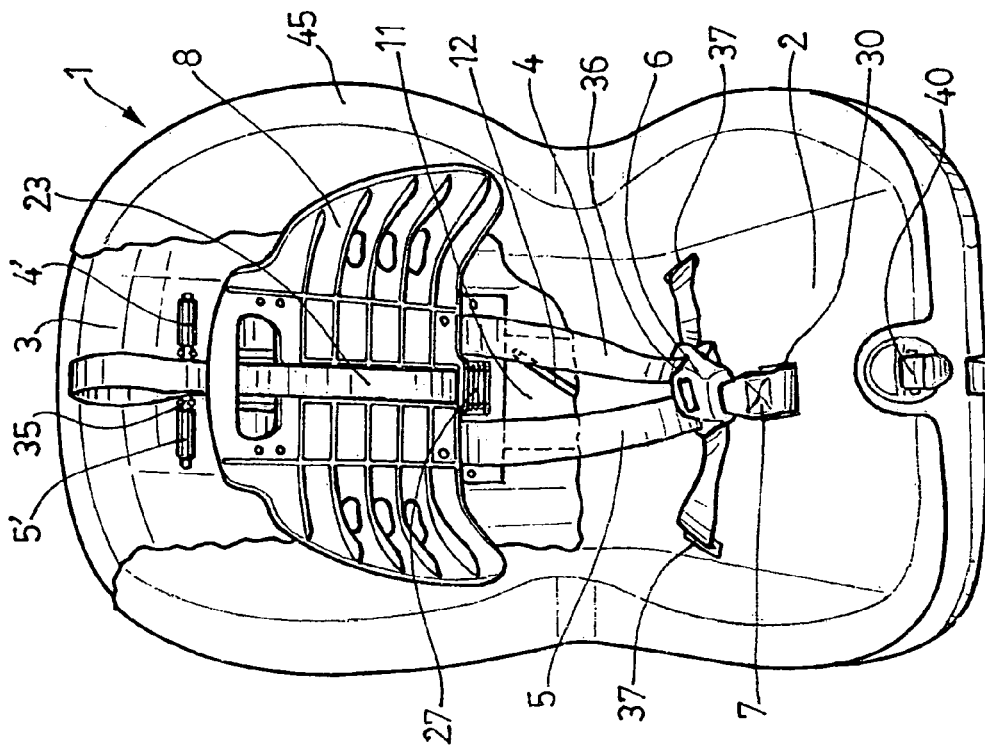

According to the drawings the infant seat for motorcars comprises a body (1) forming the actual seat (2) and the backrest (3) and being provided with two safety straps (4) and (5) for the child, said straps being frontally fitted to a buckle (6) to which the crotch strip (7) is attached.

The straps (4) and (5) are fitted to a headrest (8) being fitted to the backrest (3) in a vertically shiftable arrangement and being integrally provided with a mechanism (9) from which a transmission element (10) extends which is linked to the lower end (7') of the crotch strip (7), this latter being also fitted in a slidable arrangement. This transmission mechanism (9) comprises a vertical plate (11) having a slant slit (12) therein (FIG. 3), the head (13) of a slider (14) being slidingly engaged in said slit whereas said slider is slidingly and transversally guided along the guide (15) being provided in a small cover (16) being fitted to the rear portion of the backrest (3) where a transversal slit (17) has been provided, said slider having a flexible rod or rope linked to it, said flexible rod or rope making up the transmission element (10) being fit to be shifted along the inside of a stationary sheath (18).

The headrest (8) comprises means (19) being provided for locking it in its different positions (FIG. 6), said means comprising the arrangement of an angular element being fit to be swung about its angular point (20), a helical spring (21) being fitted on the swing pin of said angular element and thus biasing it into lockedly maintaining its chosen position. This angular element is fit to be actuated through its horizontal branch (22), this latter having attached to it a strip (23) being provided for being pulled upwards and thereby causing said means to be unlocked by thus disengaging a transversal element (24) being fit to selectively fit at its ends into the recesses (25) being provided along the rear portion of the backrest (3) as per two opposite aligned arrangements, said transversal element (24) being fitted to the other branch (26) of the angular element, this latter branch being arranged in a vertical arrangement. Reference numeral (27) designates a spring additionally aiding said headrest locking means to regain the stable position.

The transmission element (10) is fitted to the lower end (7') of the crotch strip through the intermediary of a small frame (28) having an intermediary, transversal length (29) where said end is fitted, said small frame being fit to be shifted in a window (30) of the bottom (2) of the seat (FIG. 4) where it is to be removably retained in respective recesses (31) being provided at the two opposite sides of said window (30), the aforementioned cross member (29) projecting from the plane being formed by the frame (28) being fit to selectively fit into the aforementioned recesses (FIG. 5), said cross member being in a position to be thus removably retained by means of resilient skids (32) being linked to the lateral ends of the frame and slidingly resting on guides (33) being provided along a cover (34) being fitted to the bottom (2) of the seat.

The upper ends (4') and (5') of the straps are fitted to a cross member (35) being fixedly fitted to the upper portion of the front surface of the backrest (FIG. 1).

In the case being depicted here, after having passed through slits (36) of the buckle (6) the lower ends of the straps (4) and (5) extend through the seat through lateral openings (37) and are joined together (38) thus forming a strip (39) extending through the tension device (40) and thereupon projecting at the end (41) at the front portion of the seat (2).

Before being joined together the lower ends of the straps (4) and (5) extend through a unit (42) consisting of guiding elements, said unit being formed by a U-shaped bearing member (43) being fixedly secured to the bottom of the seat (2) and having its two branches crossed with each other as they extend from their bent starting point, each of said two branches being provided with a respective roller (44).

Reference numeral (45) designates a padding piece covering the seat (1) before arranging the upholstery, said piece being shown in a partially cutaway view in order to thus afford a better view of some components of this seat.

In order to achieve the change of length of the straps (4) and (5) and of the space being afforded at the crotch region (7) one proceeds as follows: by upwardly pulling the strip (23) as per arrow (F) in FIG. 6 the angular element is made to swing as per arrow (F') and the locking of the straps is thus unlocked and the headrest (8) can hence be moved together with the plate (11) acting on the slider (14) and thereby shifting the frame (28) and with it the crotch strip (7). Once having achieved the desired change of the space being afforded by the straps and at the crotch region the strip (23) is released and the position having been chosen is thereby locked again when the transversal element (24) once more fits into the recesses (25).

The invention claimed is:

1. An infant seat for motorcars that comprises a body forming a seat and a backrest and being provided with safety straps for a child, said straps being fitted to a crotch strip; wherein the straps are fitted to a headrest being fitted to the backrest in a vertically shiftable arrangement and being integrally provided with a mechanism from which a transmission element extends which is linked to the lower end of the crotch strip, wherein the crotch strip is fitted in a slidable arrangement, in such a way that the lifting and lowering motions of the headrest bring about a joint increase or reduction of the space being afforded both by the straps and the crotch strip.

2. An infant seat for motorcars as per claim 1, wherein the headrest comprises means for locking the headrest in different positions.

3. An infant seat for motorcars as per claim 2, wherein the means being provided for locking the headrest in its different positions comprise the arrangement of a resiliently biased angular element being fit to be swung about its angular point, one of the branches of said angular element being provided for being manually actuated and wherein the other branch is fitted with a transversal element fitting into recesses provided along the rear portion of the backrest.

4. An infant seat for motorcars as per claim 1, wherein the transmission mechanism comprises a plate provided with a slant slit, the head of a horizontal slider being slidingly engaged in said slit, said slider having a flexible rod or rope linked to it, said flexible rod or rope making up the transmission element being provided for transmitting the shifting motion to the crotch strip.

5. An infant seat for motorcars as per claim 1, wherein the transmission element is fitted to the lower end of the crotch strip through the intermediary of a small frame to which said end of the crotch strip is fitted, said small frame being fit to be shifted in a window of the bottom of the seat.

6. An infant seat for motorcars as per claim 5, wherein the frame is fit to be removably retained at different locations along the window.

7. An infant seat for motorcars as per claim 6, wherein the window the frame is transversally provided with a projecting cross member to fit into recesses provided at the two opposite sides of the window where the frame is to be removably retained by resilient skids being linked to the frame and slidingly resting on guides provided along a cover being fitted to the bottom of the seat.

* * * * *